Nov. 11, 1941.　　　W. H. McKISSICK　　　2,262,328
SNATCH BLOCK
Filed June 9, 1938　　　2 Sheets-Sheet 1
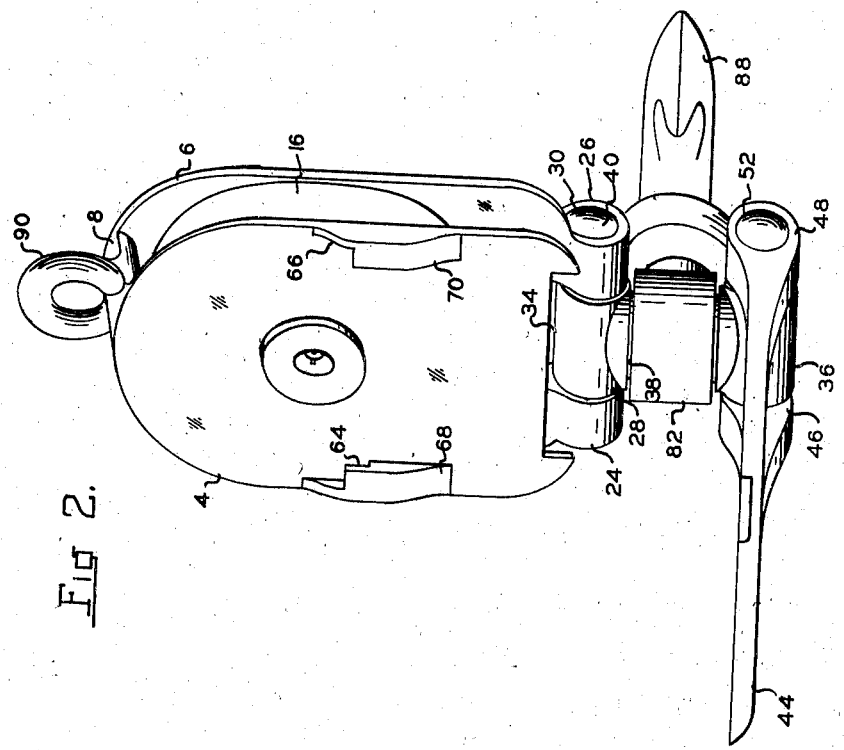
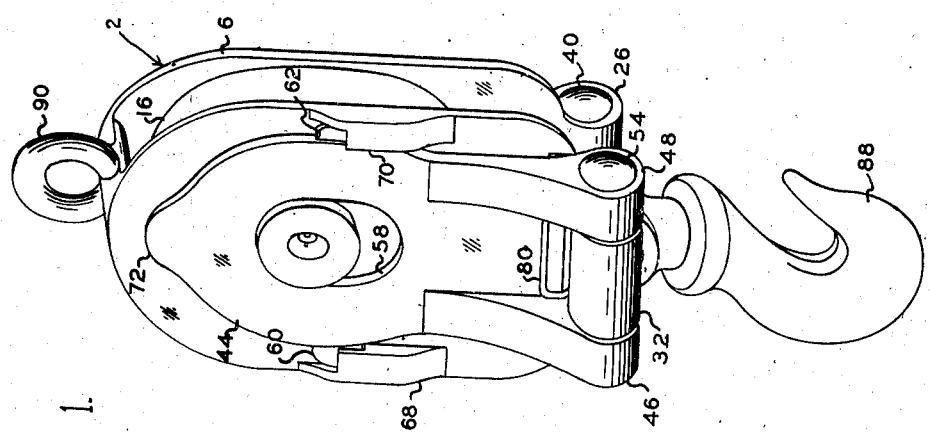
INVENTOR
WILLIAM H. McKISSICK
BY *Barry + Cyr*
ATTORNEYS Nov. 11, 1941.  W. H. McKISSICK  2,262,328
SNATCH BLOCK
Filed June 9, 1938  2 Sheets-Sheet 2

INVENTOR
WILLIAM H. McKISSICK
BY Barry+Cyr
ATTORNEYS

Patented Nov. 11, 1941

2,262,328

UNITED STATES PATENT OFFICE 2,262,328

SNATCH BLOCK

William H. McKissick, Tulsa, Okla.

Application June 9, 1938, Serial No. 212,816

9 Claims. (Cl. 254—193)

This invention relates to improvements in snatch blocks and more particularly, but not by way of limitation, to a quick opening snatch block for use in heavy trucking, tractor and rotary work.

An important object of this invention is to provide a snatch block that has a pivoted cheek capable of a quick opening action whereby threading of a line is facilitated.

Another object of this invention is to provide a snatch block having a swivel connected hook carried by a freely rotatable bearing to allow for angular movement of the hook with respect to the snatch block.

And still another important object of the invention is to provide a quick opening snatch block having a pivoted cheek which in locking position is partially supported on a sheave pin of the block.

With the foregoing objects outlined and with another object in view which will appear as the description proceeds, the invention consists in the novel features hereinafter described in detail in connection with the accompanying drawings, and more particularly pointed out in the appended claims.

In the drawings:

Fig. 1 is a perspective view showing the device in closed position.

Fig. 2 is a perspective view showing the snatch block in open position.

Figure 3:
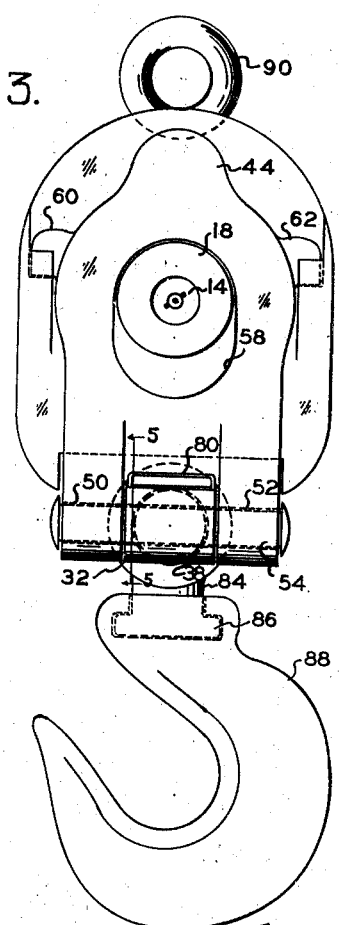
Fig. 3 is a front elevational view of the snatch block.

Referring to the drawings in detail, the quick opening snatch block comprises an angular shell or body member having two legs forming plates 4 and 6, held in spaced relation by an integral connecting bar 8. The plates 4 and 6 are each provided with apertures 10 and 12 adapted to receive a shaft or pin 14, upon which is mounted a freely rotatable sheave or pulley 16. One end of the shaft is provided with an annular flange 18 slightly larger in diameter than the aperture 12. The shaft 14 in position in the apertures is prevented from longitudinal displacement by a cap member 20, cooperating with the flange 18. The cap is secured to the shaft or pin 14 by a cotter pin 22 or the like. Rotation of the shaft in the apertures 10 and 12 is prevented by any conventional pin and slot or key connection, not shown.

The cheek or plate 6 at its lower end portion is provided with depending ears 24 and 26 disposed in spaced relation to each other and having bores forming bearings 28 and 30, respectively. A cross head 32 comprises a pair of oppositely disposed bearing members 34 and 36 connected together by an integral stud 38, and is pivotally connected to the body member 2 by having the bearing member 34 interposed between the ears 24 and 26 and held in position by a shaft 40 secured in the bearings 28 and 30 of the ears 24 and 26 by upsetting the ends of the shaft 40. It will be understood that the bearing 34 is freely rotatable on the shaft 40 in order to provide a pivotable connection for the shell or body member 2.

In cooperation with the plate 4 and in order to allow for a quick and efficient threading of a line on the sheave 16, a plate 44 is pivotally connected to the cross head 32 in a manner identical with the plate 6. The cheek or plate 44 has depending ears 46 and 48 in spaced relation with each other and provided with bores 50 and 52 receiving a shaft 54 on which the bearing 36 is loosely journaled. The shaft 54 is secured in the bores 50 and 52 of the ears 46 and 48 by upsetting. As clearly shown in Fig. 1, with the snatch block in closed position, the pivotally mounted plate 44 lies flush against the plate 4 and has an oblong aperture 58 adapted to bear against the annular flange 18. The outer periphery of the plate 44 is provided with a pair of oppositely disposed lugs 60 and 62 adapted to fit in locking engagement with recesses 64 and 66 formed in the projections 68 and 70 oppositely disposed on the plate 4. The top portion of the plate 44 is of an irregular contour to form a handle 72 for grasping the plate.

It will be apparent that when the snatch block is in closed or locked position, as shown in Fig. 1, and with the pivotable connection of the plates 6 and 44, the plate 44 can be moved upward to release the lugs 60 and 62 from locking engagement with the recesses 64 and 66, and thus allow a quick opening of plate 44 away from the plate 4 so that the sheave may be threaded.

Figure 4:
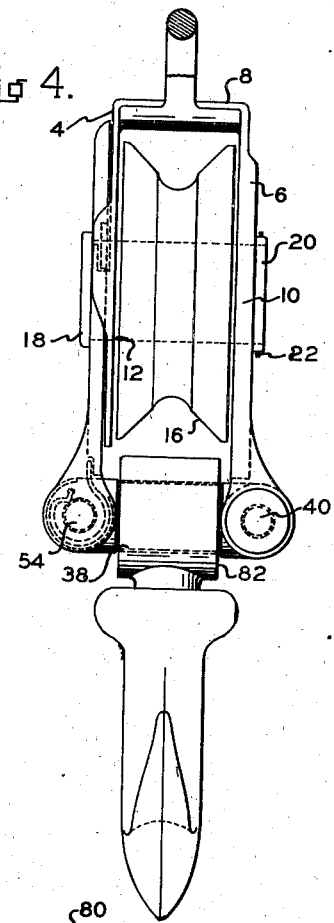
Fig. 4 is a side elevational view.
Figure 5:
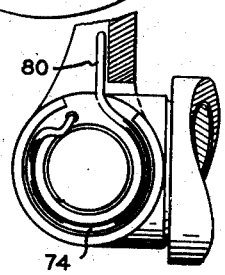
Fig. 5 is a sectional elevational view taken on lines 5—5 of Fig. 3.
Figure 6:
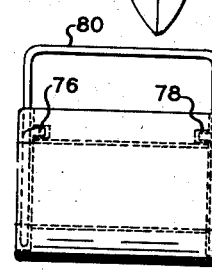
Fig. 6 is a detailed elevational view showing the spring encircling the shaft.

As clearly shown in Figs. 4, 5 and 6, the shaft 54 at points adjacent the ends of bearing 36 is encircled by a spring 74 having its ends anchored in cavities 76 and 78 provided in the bearing 36. The intermediate portion 80 of the spring 74 extends upward into an abutting relation with the plate 44 in order to provide tension against the plate 44 and thus assist in holding the latter in locking position against the plate 4. The spring 74 also assists in preventing any accidental pivoting movement of the plate 44.

The stud 38 of the cross head lies in a plane perpendicular to the shafts 40 and 54 and has integrally cast therewith a loosely journaled bearing 82. The bearing 82 has a projection 84 forming a head 86 upon which is freely journaled a hook 88 by a swivel connection. It will be understood that a clevis or the like may be used in lieu of the hook 88.

It will be obvious that the swivel connection allows for free rotation of the hook 88 around the head 86 and in addition the bearing 82 allows for movement of the hook in an arcuate path, which is especially advantageous to prevent any strain on the hook due to angular movement. With this construction, the snatch block in operation will always stay in a plane parallel with the direction of pull, and the free rotation of the bearing 82 allows for changing the angular position of the hook to provide a variance in the direction of pull, which is especially advantageous in the skidding of heavy loads.

The connecting arm 8 for the body member 2 has integrally cast therewith a hook 90 for supporting the snatch block when in operation.

From the foregoing, it will be apparent that a quick opening snatch block is provided which is simple and efficient in operation in that it allows for a quick threading or unthreading of any line on the sheave whereby the snatch block can be moved to various operating positions.

It will be understood that the construction, arrangement of parts, and operation of the snatch block, will be clear to those skilled in the art and it will be obvious that changes may be made in the details disclosed, without departing from the spirit of the invention as expressed in the claims.

What I claim is:

1. A snatch block comprising a shell member having apertures for receiving a pin on which is journaled a pulley, a flange provided at one end of the pin, a cross head pivotally connected to one end of the shell member to provide movement of the cross-head in an angular path with respect to one side face of the shell, a plate pivotally connected to the cross head and cooperating with the shell member for selective opening or closing of the snatch block with respect to the pulley, an aperture in the plate cooperating with the flange for partially supporting the plate in closed position, means provided on the shell member adapted to cooperate with the plate for interlocking the plate and shell together.

2. A snatch block comprising a shell member having apertures for receiving a pin on which is journaled a pulley, an annular flange provided at one end of the pin, a cross head pivotally connected to one end of the shell member, a plate pivotally connected to the cross head and cooperating with the shell member for selective opening or closing of the snatch block with respect to the pulley, an aperture in the plate cooperating with the flange for partially supporting the plate in closed position, recessed projections on the shell member, lugs provided on the plate adapted to cooperate with the recessed projections for holding the plate in locking position with respect to the shell member.

3. A snatch block comprising a shell member having apertures for receiving a shaft, a freely rotatable pulley journaled on the shaft, an annular flange provided at one end of the shaft, a cross head pivotally connected to one end of the shell member, a plate pivotally connected to the cross head and cooperating with the shell member for selective opening or closing of the snatch block with respect to the pulley, an aperture in the plate cooperating with the flange for partially supporting the plate in closed position, oppositely disposed recessed projections on the shell member, oppositely disposed lugs provided on the plate and adapted to cooperate with the recessed projections for holding the plate in locking position with respect to the shell member, a bearing freely journaled on the cross head, a hook secured to the bearing by a swivel connection, said bearing allowing angular movement of the hook with respect to the cross head.

4. A snatch block comprising a shell member having apertures for receiving a pin on which is journaled a pulley, a cross-head, means for pivoting the shell member to the cross-head, a plate pivoted to the cross-head and cooperating with the shell member for selective opening or closing of the snatch block with respect to the pulley, means in the plate cooperating with means on the pin for supporting the plate in closed position, said shell member being provided with recessed projections, and lug means on the plate adapted to cooperate with the recessed projections to assist in holding the plate in locking position with respect to the shell member.

5. A snatch block comprising a shell including opposite side walls, a shaft supported by said walls and having one end extending outwardly beyond one side wall, a cross-head pivotally connected to the opposite side wall for movement about an axis arranged perpendicularly to the axis of said shaft, a sheave mounted on the shaft between the side walls, a plate pivotally connected to the cross-head for movement toward and away from the wall through which the shaft extends, said shaft having an abutment surface interlocking with said plate, and the plate being movable upwardly and downwardly relatively to said shaft for releasing and interlocking said plate with said shaft, and means for latching the plate to the wall through which the shaft extends, said latching means including interlocked elements on the plate and one of the side walls, releasable from one another by a vertical movement of the plate relative to said side wall.

6. A snatch block comprising a shell having a clevis secured to one end thereof, the shell having opposite side walls, a shaft supported by said walls and having one end thereof projecting through one of the walls, a cross-head pivotally connected to the end of one wall opposite to that where the clevis is positioned, for movement about an axis arranged perpendicular to the axis of the shaft, said cross-head including a bearing portion having an axis arranged parallel to the shaft, a collar swiveled on said bearing portion, a hook connected to said collar for movement about an axis arranged perpendicularly to the axis of said bearing portion, a plate pivotally connected to the cross-head for movement toward and away from the wall of the shell through which the shaft extends, said plate having an abutment surface engaging the projecting portion of the shaft, latching means securing the plate to the last-mentioned wall, and a sheave mounted on said shaft.

7. A snatch block comprising an inverted U-shaped shell having opposite side walls, a shaft connecting said side walls and having an end portion extending outwardly beyond one of the side walls, a cross-head pivotally connected to the lower end of the other side wall for movement toward and away from said shaft, a plate having its lower end pivotally connected to the cross-head for movement toward and away from the wall through which the shaft extends, said plate having a vertically disposed slot to receive and interlock the projecting end of the shaft with the plate and allow the plate to slide vertically relatively to the shaft, latching means for the plate comprising interlocking elements on the plate and wall through which the shaft extends, and a sheave mounted on said shaft.

8. A snatch block comprising a shell member having apertures, a shaft extending through the apertures and supported by the shell, a pulley mounted on the shaft, a flange provided at one end of the shaft, a cross-head pivotally connected to one end of the shell member to provide movement of the cross-head in a plane substantially perpendicular to a side face of the shell, a plate pivoted to the cross-head and cooperating with the shell member for selective opening or closing of the snatch block with respect to the pulley, an aperture in the plate cooperating with the flange for partially supporting the plate in closed position, and latching means for the plate comprising interlocking elements on the plate and shell.

9. A snatch block comprising a shell member having apertures for receiving a pin on which is journaled a pulley, a cross-head, means for pivoting the shell member to the cross-head, a plate pivoted to the cross-head and cooperating with the shell member for selective opening or closing of the snatch block with respect to the pulley, means in the plate cooperating with means on the pin for partially supporting the plate in closed position, latching means for the plate comprising interlocking elements on the plate and shell, and spring means cooperating with the plate and cross-head and arranged adjacent to the latter for yieldingly holding the plate in closed position.

WILLIAM H. McKISSICK.